March 17, 1970   F. THOMA ET AL   3,500,757

PRESSURE CONNECTION OF LOW STRUCTURAL HEIGHT

Filed Jan. 5, 1968

INVENTORS  
FRANK THOMA  
ULRICH CONRAD

BY *Craig and Antonelli*

ATTORNEY

United States Patent Office 3,500,757
Patented Mar. 17, 1970

3,500,757
PRESSURE CONNECTION OF LOW STRUCTURAL HEIGHT
Frank Thoma, Stuttgart, and Ulrich Conrad, Ludwigsburg-Ossweil, Germany, assignors to Daimler-Benz Aktiengesellschaft, Stuttgart-Unterturkheim, Germany
Filed Jan. 5, 1968, Ser. No. 695,960
Claims priority, application Germany, Jan. 7, 1967,
D 51,966
Int. Cl. F04b 19/22, 21/00
U.S. Cl. 103—154                3 Claims

ABSTRACT OF THE DISCLOSURE

A pressure connection of low structural height for an injection pump, for example, of an internal combustion engine to effect a connection of one end of an injection line at substantially a right angle to the pump piston axis with a cross bore provided in a spring housing which forms part of a pressure nipple and is adapted to be screwed into the body of an injection pump, whereby a tightening or clamping element surrounds the end of the injection line and directly, sealingly connects the enlarged conical sealing surface of the end of the injection line with a similarly shaped conical sealing surface disposed at the outer end of the cross bore.

Background of the invention

Figure 1:
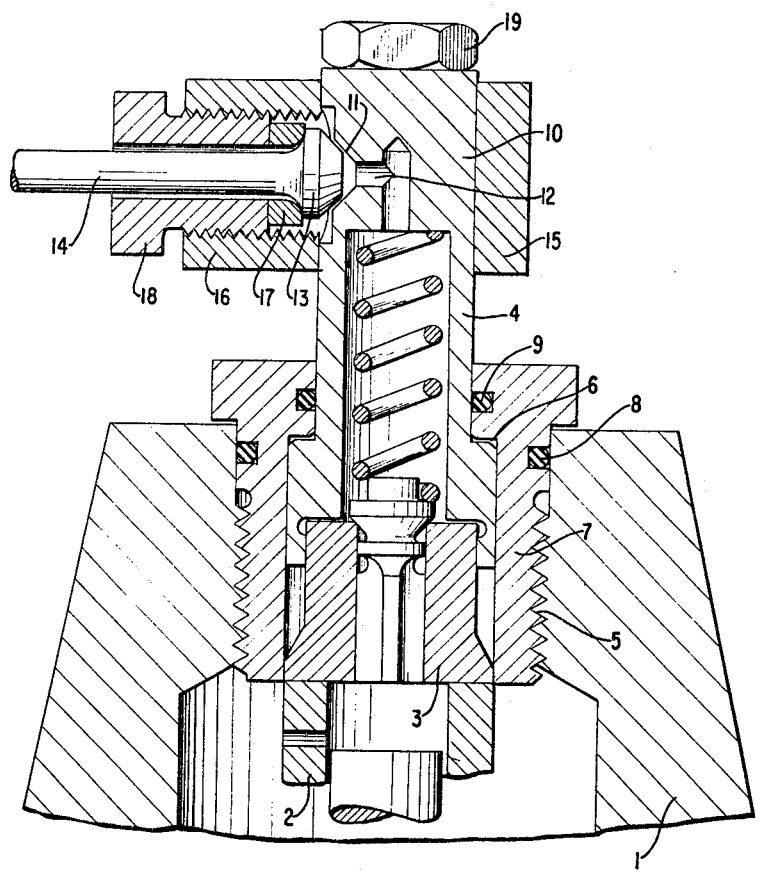

The present invention relates to a pressure connection of low structural height for an injection pump, preferably arranged at an internal combustion engine, for the connection of one end of an injection line extending away at right angle to the pump piston axis and surrounded by a tightening part, such as a tightening bolt or tightening nut, and pressed by the latter against a sealing cone, with a spring housing provided with a cross bore of the pressure nipple or pressure connection adapted to be screwed into a body of the injection pump. With known engines having an injection pump the injection line extends away from the injection pump in the direction of a pump piston axis. With engines, especially with V-type engines, in which the injection pump is installed between the two cylinder rows, the disadvantage arises in the prior art with the installation of the engine within an engine space limited in height that the injection lines project beyond the profile or contours of the engine.

It has, therefore, already been proposed in the prior art to lead the injection line at a medium height of the spring housing toward the latter at right angle to the pump piston axis and to connect the injection line with a pivotal connecting nipple which surrounds in the manner of a connecting ring the spring housing provided with a cross bore and which is tightened under interposition of sealing rings between a shoulder of the spring housing and a unilaterally closed nut, such as a cap nut screwed over the upper end of the spring housing. However, this prior art arrangement entails the disadvantage that it becomes leaky in due course because the two high-pressure sealing surfaces possess a relatively very large sealing radius and consequently require extraordinarily high sealing forces which the spring housing is unable to transmit in the course of time.

Summary of the invention

The present invention avoids the aforementioned disadvantage in that the end of the injection line is directly connected sealingly to the cross bore provided with the sealing cone.

Accordingly, it is an object of the present invention to provide a pressure connection for injection pumps of internal combustion engines which avoid by extremely simple means the aforementioned shortcomings and drawbacks encountered in the prior art.

Another object of the present invention resides in a pressure connection of the type described above which excels by a low structural height.

A further object of the present invention resides in a relatively low pressure connection for the injection pumps of internal combustion engines to permit installation thereof within the profile of the engine.

Still a further object of the present invention resides in an inlet nipple for the pressure connection of a fuel injection line with the injection pump of an internal combustion engine in which the injection lines do not protrude beyond the vertical contours of the engine.

Still another object of the present invention resides in a pressure connection of the type described above which is simple in construction yet obviates the high sealing forces necessary heretofore.

A still further object of the present invention resides in a pressure connection for the inlet lines of injection pumps in internal combustion engines which are characterized by extraordinary long length of useful life.

Figure 2:
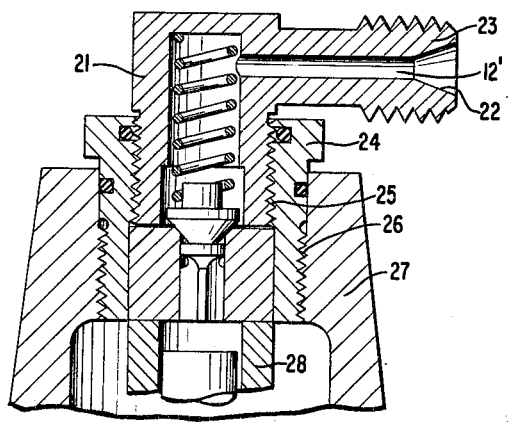

These and further objects, features and advantages of the present invention will become more obvious from the following description when taken in connection with the accompanying drawing which shows, for purposes of illustration only, two embodiments in accordance with the present invention, and wherein:

FIGURE 1 is a schematic longitudinal cross-sectional view through a first embodiment of a pressure connection in accordance with the present invention provided with a tightening element emplaced on the spring housing, and FIGURE 2 is a schematic longitudinal cross-sectional view through a second embodiment of a pressure connection in accordance with the present invention provided with a spring housing having a threaded nipple.

Referring now to the drawing wherein like reference numerals are used throughout the two views to designate like parts, and more particularly to FIGURE 1, a pump cylinder 2 is tightened within a body 1 of an injection pump by way of a relief valve body 3 and a spring housing 4 of the pressure connection. A threaded sleeve 7 engages at the injection pump body 1 by means of a thread 5 and at the spring housing 4 by means of a shoulder 6 whereby the parts 2, 3, and 4 are tightened or clamped together in a sealing manner. O-rings 8 and 9 arranged within the upper area of the threaded sleeve 7 seal the low pressure space of the pump with respect to the outside. An upper end 10 of the spring housing 4 is provided with a cross bore 12 terminating in a sealing cone 11 with which a conically enlarged end 13 of an injection line 14 is directly connected with the aid of a tightening piece 15, 16, not performing any sealing function itself, which is placed with a longitudinal bore over the spring housing 4 and into whose threaded nipple 16, extending transversely thereto and aligned with the sealing cone 11, a tightening or clamping bolt 18 surrounding the end 13 of the injection line 14 is screwed by the interposition of a sliding disk 17. A hexagonal part 19 at the upper end 10 of the spring housing 4 serves for the alignment of the cross bore 12 with the injection line 14 during the tightening of the threaded sleeve 7.

In the second embodiment the spring housing 21 comprises a threaded nipple 23 formed integrally therewith and containing a sealing cone 22. A conventional tightening or clamping nut (not shown) which surrounds the end of the injection line is adapted to be screwed over the threaded nipple 23 in a manner corresponding to the first embodiment. A threaded sleeve 24 surrounding the spring housing 21 is threadably connected therewith by means of a thread 25 whose pitch is smaller than a pitch of an external thread 26 of the threaded sleeve by means of which the sleeve 24 is threaded into the body 27 of the injection pump. During assembly of the parts 27, 24, and 21, 23 during which the injection line and its clamping nut are completely separated from the threaded nipple 23 in order that the latter can be rotated freely, these parts at first are screwed together loosely. When they have almost reached their final position, the threaded nipple 23 is brought into the direction of the injection line to be subsequently connected thereto and is held fast during tightening of the threaded sleeve 24. The final pressure abutment of the spring housing 21 against the relief valve body 27 and the pump cylinder 28 takes place as a result of the different pitches of the threads 25 and 26. The connection of the injection line takes place only after the tightening of the threaded sleeve 24.

While we have shown and described only two embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A pressure connection of low structural height for the connection of one end of an injection line with an injection pump having a piston and being arranged, for example, at an internal combustion engine, comprising pressure nipple means which forms spring housing means adapted to be threadably secured in the body of the injection pump and provided with cross bore means forming a sealing cone, the end of the injection line being connected directly with the cross bore of the sealing cone and extending substantially at a right angle to the pump piston axis, said injection line being provided at said end with tightening means surrounding the same for pressing the end of the injection line, enlarged in the manner of a complementary sealing cone, against the sealing cone provided in said pressure nipple means, wherein a tightening element, devoid of sealing functions, is placed over the spring housing means of said pressure nipple means, said tightening element including a threaded nipple receiving the end of the injection line, said threaded nipple being substantially aligned with the first-mentioned sealing cone, and the tightening means being adapted to be threadably secured with the threaded nipple.

2. A pressure connection according to claim 1, further comprising a threaded sleeve for securing said pressure nipple means in said pump body, said threaded sleeve engaging the spring housing means by means of an annular shoulder.

3. A pressure connection of low structural height for an injection pump arranged, for example, at an internal combustion engine for the connection of one end of an injection line extending at substantially a right angle to a pump piston axis with a spring housing provided with a cross bore of a pressure nipple means adapted to be screwed into the body of the injection pump, wherein the improvement comprises a sealing cone at the end of said cross bore, and tightening means surrounding the end of said injection line for directly and sealingly connecting the end of said injection line with said sealing cone, wherein a tightening element, devoid of sealing functions, is placed over the spring housing of said pressure nipple means and includes a threaded nipple receiving the end of the injection line, said threaded nipple being substantially aligned with the sealing cone, and the tightening means being threadably secured with the threaded nipple.

References Cited

UNITED STATES PATENTS

| | | | |
|---|---|---|---|
| 1,438,147 | 12/1922 | Van Amstel | 103—154 |
| 1,995,125 | 3/1935 | Kniskern et al. | 103—40 |
| 2,109,785 | 3/1938 | Starr | 103—154 |
| 2,421,899 | 6/1947 | Messner | 103—154 |
| 2,446,497 | 8/1948 | Thomas | 123—140 |

OTHER REFERENCES

Page 235 of "The Oil Engine and Gas Turbine" of November 1960.

ROBERT M. WALKER, Primary Examiner

U.S. Cl. X.R.

103—202